(12) United States Patent
Gilpatrick et al.

(10) Patent No.: US 7,083,120 B2
(45) Date of Patent: Aug. 1, 2006

(54) PRESSURIZED FLUID DELIVERY APPARATUS

(75) Inventors: Richard J. Gilpatrick, Whitewater, WI (US); Barry Fay, Janesville, WI (US)

(73) Assignee: Briggs & Stratton Power Products Group, LLC, Jefferson, WI (US)

( * ) Notice: Subject to any disclaimer, the term of this patent is extended or adjusted under 35 U.S.C. 154(b) by 187 days.

(21) Appl. No.: 10/701,741

(22) Filed: Nov. 4, 2003

(65) Prior Publication Data

US 2005/0093297 A1   May 5, 2005

(51) Int. Cl.
*A62C 31/02* (2006.01)

(52) U.S. Cl. .............. 239/397; 239/526; 239/390; 239/391; 285/282; 285/316

(58) Field of Classification Search ............... 285/282, 285/277, 316; 239/532, 526, 390, 391, 397
See application file for complete search history.

(56) References Cited

U.S. PATENT DOCUMENTS

| | | | | |
|---|---|---|---|---|
| 2,476,172 | A | * | 7/1949 | Williams ............... 285/280 |
| 2,819,914 | A | * | 1/1958 | Eitner .................. 285/70 |
| 2,935,338 | A | * | 5/1960 | Mills, Jr. .............. 251/149.5 |
| 3,280,526 | A | * | 10/1966 | Pepitonic .............. 52/64 |
| 3,964,771 | A | | 6/1976 | Baudouin |
| 4,139,222 | A | * | 2/1979 | Loland ................. 285/27 |
| 4,566,723 | A | | 1/1986 | Schulze et al. |
| 4,660,803 | A | * | 4/1987 | Johnston et al. ........ 251/149.1 |
| 4,709,859 | A | | 12/1987 | Schulze et al. |
| 4,988,129 | A | | 1/1991 | Saito et al. |
| 5,029,904 | A | | 7/1991 | Hunt |
| 5,127,679 | A | | 7/1992 | Pouplier |
| 5,217,166 | A | | 6/1993 | Schulze, deceased et al. |
| 5,238,221 | A | | 8/1993 | Schwaderer et al. |
| 5,269,566 | A | | 12/1993 | Do et al. |
| 5,348,349 | A | * | 9/1994 | Sloane ................. 285/92 |
| 5,350,201 | A | | 9/1994 | Bynum |
| 5,362,110 | A | | 11/1994 | Bynum |
| 5,362,111 | A | | 11/1994 | Harbin |
| 5,586,790 | A | | 12/1996 | Bynum |
| 5,605,359 | A | | 2/1997 | Hoff |
| 5,620,427 | A | | 4/1997 | Werschmidt et al. |
| 5,788,292 | A | | 8/1998 | Körner et al. |
| 5,873,386 | A | | 2/1999 | Arosio |

(Continued)

FOREIGN PATENT DOCUMENTS

DE          23 45 504      3/1975

(Continued)

*Primary Examiner*—David Bochna
(74) *Attorney, Agent, or Firm*—Michael Best & Friedrich LLP

(57) ABSTRACT

A pressurized fluid delivery apparatus such as a pressure washer or sprayer including a pump adapted to provide a pressurized fluid, a conduit fluidly connected with the pump to receive the pressurized fluid from the pump, a fluid accessory fluidly connected with the conduit to receive the pressurized fluid from the conduit, and a quick-disconnect assembly selectively fluidly connecting the fluid accessory and the conduit. The quick-disconnect assembly includes a male fitting coupled to one of the fluid accessory and the conduit. The male fitting includes a male component and a first non-circular surface. The quick-disconnect assembly also includes a female fitting coupled to the other of the fluid accessory and the conduit. The female fitting includes a female component having an opening for receiving the male component and a second non-circuit surface coupled to the first non-circular surface to prevent rotation between the male fitting and the female fitting.

36 Claims, 10 Drawing Sheets

U.S. PATENT DOCUMENTS

| | | |
|---|---|---|
| 5,882,044 A | 3/1999 | Sloane |
| 5,927,683 A | 7/1999 | Weh et al. |
| 6,158,677 A | 12/2000 | Coles |
| 6,302,447 B1 | 10/2001 | Lee |
| 6,302,451 B1 * | 10/2001 | Olson ........................ 285/330 |
| 6,398,134 B1 * | 6/2002 | Hickson et al. ............. 239/394 |
| 6,450,545 B1 * | 9/2002 | LeMay et al. ................. 285/93 |
| 6,478,343 B1 | 11/2002 | King Lee |
| 6,651,909 B1 * | 11/2003 | Bugarin ..................... 239/390 |
| 6,682,106 B1 * | 1/2004 | Parker ........................ 285/282 |
| 6,892,957 B1 * | 5/2005 | Bennett et al. ............. 239/146 |
| 2003/0071142 A1 | 4/2003 | Pohorecki |

FOREIGN PATENT DOCUMENTS

| | | |
|---|---|---|
| DE | 90 05 274 | 7/1990 |
| GB | 484768 | 5/1938 |
| GB | 917617 | 2/1963 |

* cited by examiner

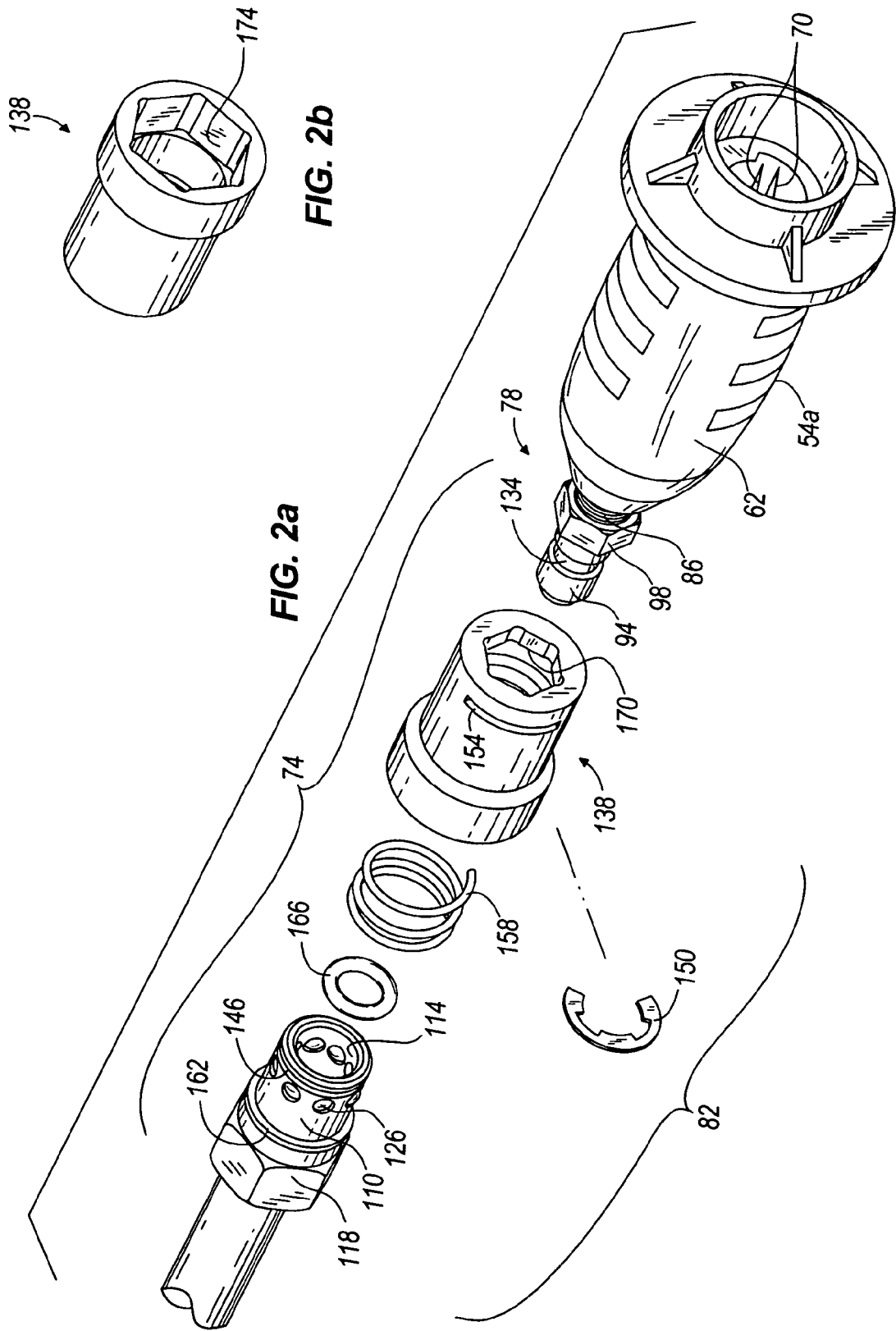

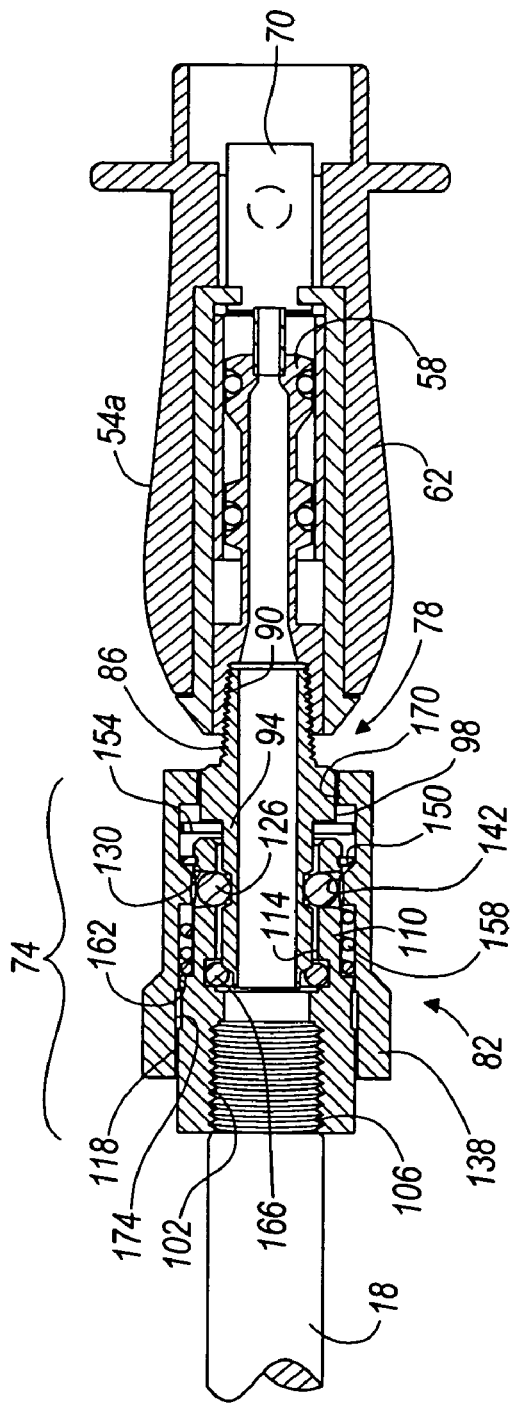
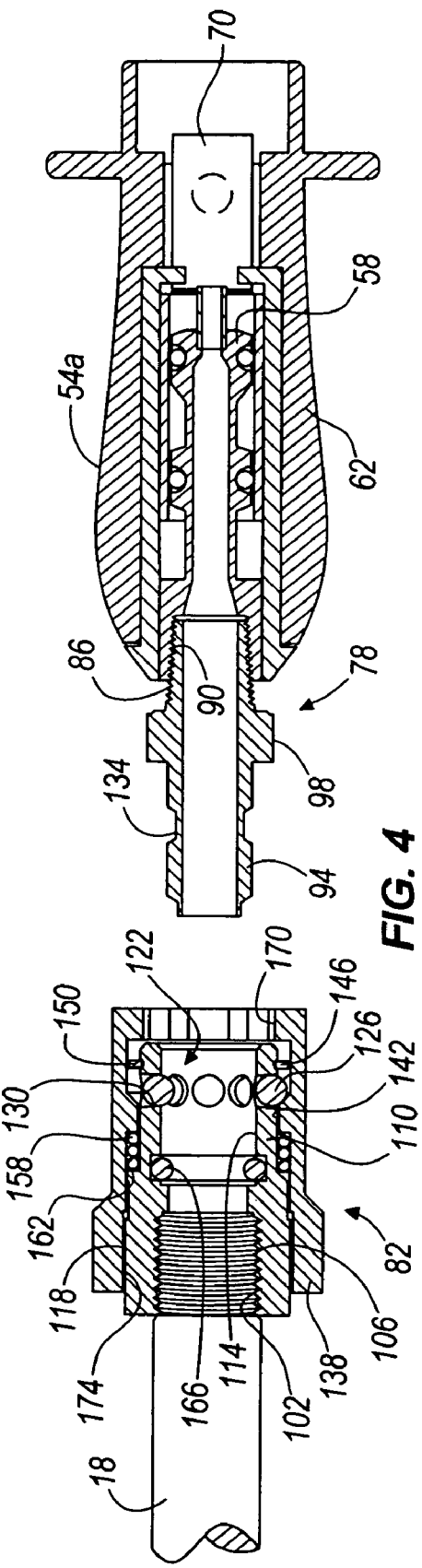
FIG. 3
FIG. 4

PRESSURIZED FLUID DELIVERY APPARATUS

FIELD OF THE INVENTION

This invention relates generally to apparatus that provides pressurized fluids such as pressure washers and liquid sprayers.

BACKGROUND OF THE INVENTION

Pressure washer assemblies are well known in the art to provide a highly-pressurized spray of water, or other liquid, for cleaning or other purposes. Conventional pressure washers comprise a power unit that drives a pump to provide the pressurized liquid to a rigid wand or other conduit. The wand is typically coupled to a gun assembly to act as an extension to the gun assembly. The gun assembly includes a hand grip for an operator to grasp with one hand, and the wand includes a handle to grasp with the other hand. A trigger is located near the hand grip to allow the operator to selectively operate the gun assembly. The gun assembly is typically fluidly connected with the pump by a flexible hose, which allows the power unit and the pump to remain in one place while the operator moves around and operates the gun assembly.

Different types of fluid accessories may be fluidly connected with the wand to provide different effects on the liquid spray exiting the wand. Such fluid accessories may include different types of nozzles, brushes, wipers, and so forth.

SUMMARY OF THE INVENTION

The present invention provides, in one aspect, a pressurized fluid delivery apparatus including a pump adapted to provide a pressurized fluid, a conduit that receives the pressurized fluid pressurized by the pump, a fluid accessory fluidly connected with the conduit to receive the pressurized fluid from the conduit, and a quick-disconnect assembly selectively fluidly connecting the fluid accessory and the conduit. The quick-disconnect assembly includes a male fitting coupled to one of the fluid accessory and the conduit. The male fitting includes a male component and a first non-circular surface. The quick-disconnect assembly also includes a female fitting coupled to the other of the fluid accessory and the conduit. The female fitting includes a female component having an opening for receiving the male component and a second non-circular surface coupled to the first non-circular surface to prevent rotation between the male fitting and the female fitting.

The present invention provides, in another aspect, a pressurized fluid delivery apparatus including a pump adapted to provide a pressurized fluid, a conduit that receives the pressurized fluid pressurized by the pump, a fluid accessory fluidly connected with the conduit to receive the pressurized fluid from the conduit, and a quick-disconnect assembly selectively fluidly connecting the fluid accessory and the conduit. The quick-disconnect assembly includes a male fitting coupled to one of the fluid accessory and the conduit. The male fitting includes a male component and a first non-circular outer surface. The quick-disconnect assembly also includes a female fitting coupled to the other of the fluid accessory and the conduit. The female fitting includes a female component having an opening for receiving the male component and a non-circular outer surface. The pressure washer assembly also includes an interlock assembly for preventing rotation between the male fitting and the female fitting. The interlock assembly includes a first component having a first non-circular inner surface engageable with the first non-circular outer surface of the male fitting, and a second component having a second non-circular inner surface engageable with the second non-circular outer surface of the female fitting. The second component is threadably connected to the first component to prevent rotation between the male fitting and the female fitting.

The present invention provides, in yet another aspect, a fluid accessory assembly adapted to be used with a pressurized fluid delivery apparatus. The delivery apparatus includes a conduit in fluid flow communication with the assembly. The fluid accessory assembly includes a fluid accessory for discharging a pressurized fluid therefrom and one of a male and female quick-disconnect fitting coupled to the fluid accessory to selectively fluidly connect the fluid accessory with the conduit. The conduit has the other of the male and female quick-disconnect fitting. The male quick-disconnect fitting has a first non-circular outer surface that is engageable with a first non-circular inner surface of the female quick-disconnect fitting to prevent rotation between the male and female quick-disconnect fittings.

The present invention provides, in a further aspect, a quick-disconnect assembly including a male fitting having a male component and a first non-circular outer surface. The quick-disconnect assembly also includes a female fitting having a female component including an opening for receiving the male component and a second non-circular outer surface. The female fitting also includes a locking assembly actuable between a locked position, in which the male component may be locked to the female component, and an unlocked position, in which the male component may be released from the female component. Further, the female fitting includes a sleeve movable along the female component to selectively actuate the locking assembly between the locked position and the unlocked position. The sleeve has a first non-circular inner surface engageable with the first non-circular outer surface of the male fitting, and a second non-circular inner surface engageable with the second non-circular outer surface of the female fitting to prevent rotation between the male fitting and the female fitting.

The present invention provides, in another aspect, an interlock assembly adapted to prevent rotation between a male quick-disconnect fitting and a female quick-disconnect fitting. The interlock assembly includes a first component having a first non-circular inner surface engageable with a first non-circular outer surface of the male quick-disconnect fitting, and a second component having a second non-circular inner surface engageable with a second non-circular outer surface of the female fitting. The second component is rotatably fixed with the first component to prevent rotation between the male quick-disconnect fitting and the female quick-disconnect fitting.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts:

FIG. 1b is a perspective view of a user operating the pressure washer assembly of FIG. 1a;

FIG. 2a is an exploded perspective view of a first construction of a quick-disconnect assembly and a fluid accessory;

FIG. 2b is a reverse perspective view of a portion of the quick-disconnect assembly of FIG. 2a;

FIG. 3 is a cross-sectional view of the quick-disconnect assembly and the fluid accessory of FIG. 2a, illustrating the quick-disconnect assembly being connected to secure the fluid accessory to a wand;

FIG. 4 is a cross-sectional view of the quick-disconnect assembly and the fluid accessory of FIG. 2a, illustrating the quick-disconnect assembly being disconnected to release the fluid accessory from the wand;

FIG. 7b is an assembled reverse perspective view of the quick-disconnect assembly and the interlock assembly of FIG. 7a;

FIG. 8 is a cross-sectional view of the interlock assembly coupled to the quick-disconnect assembly of FIG. 7a;

Figure 1A:
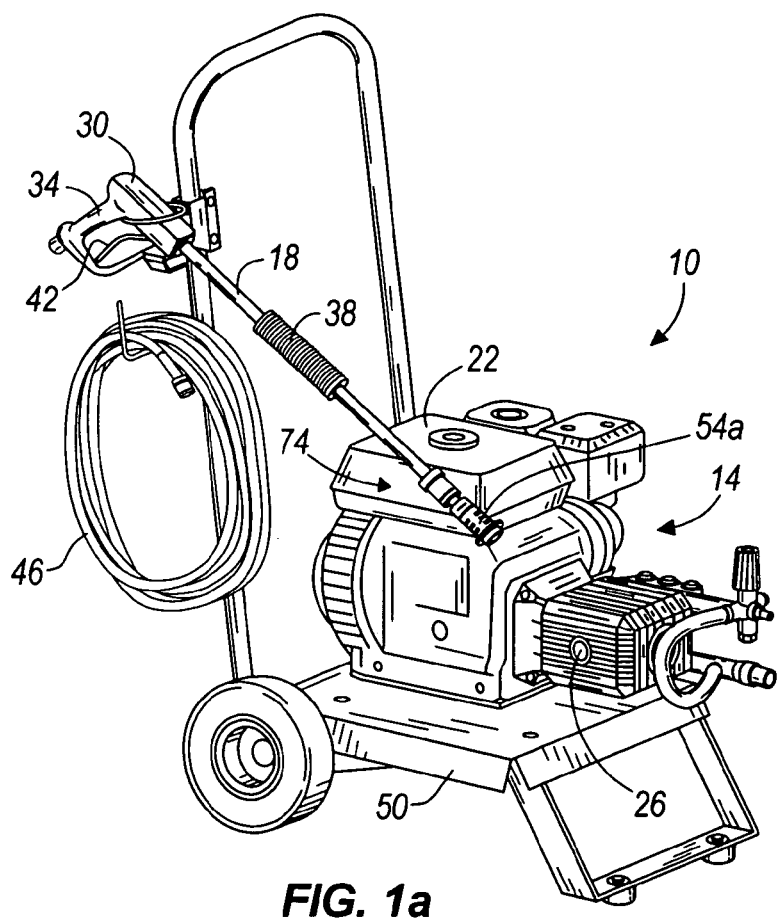
FIG. 1a is a perspective view of a pressure washer assembly.

Before any features of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limited.

DETAILED DESCRIPTION

FIG. 1a illustrates a pressure washer assembly 10 including a power unit 14 to provide a pressurized liquid to a rigid conduit, or wand 18. The power unit 14 may comprise an engine 22, electric motor, or other power unit 14. A pump 26 is operatively coupled to the power unit to provide the pressurized liquid. As understood in the art, the pump 26 may receive a supply of low-pressure fluid, pressurize the fluid, and discharge the pressurized fluid to the wand 18. The wand 18 is coupled to a gun assembly 30 and acts as an extension to the gun assembly 30. The gun assembly 30 includes a hand grip 34 for a user to grasp with one hand, and the wand 18 includes a handle 38 to grasp with the other hand. A trigger 42 is located near the hand grip 34 to allow the user to selectively operate the gun assembly 30. The gun assembly 30 is fluidly connected with the pump 26 by a flexible hose 46, which allows the power unit 14 and pump 26 to remain in one place while the user moves around and operates the gun assembly 30. Any number of conventional fluid couplings may be used to fluidly connect and secure the hose 46 to the pump 26 and to the gun assembly 30, respectively. Further, the power unit 14 and pump 26 may be transportable by a wheeled cart 50. However, the cart 50 is not an essential component of the pressure washer assembly 10.

Figure 1B:
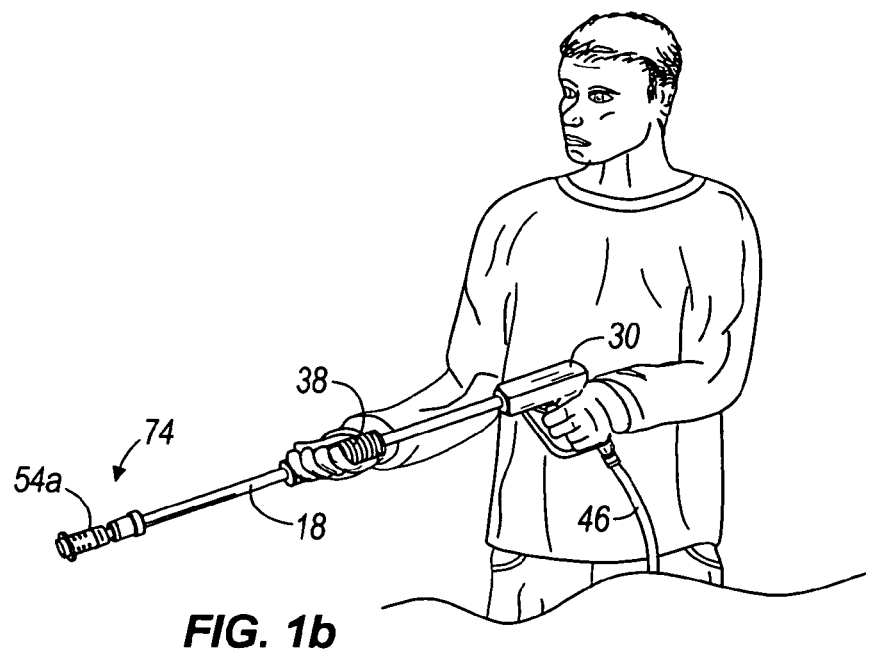

A fluid accessory 54a is shown coupled to the wand 18 in FIGS. 1a–1b. The pressurized fluid exits the wand 18 via the fluid accessory 54a. The fluid accessory 54a is adjustable to shape the discharged pressurized fluid into a spray pattern desirable for performing specific high-pressure cleaning applications. For example, the fluid accessory 54a may be adjusted to provide a wide-angle spray pattern to clean a large surface. However, the fluid accessory 54a may also be adjusted to provide a narrow-angle spray pattern to clean a small surface. Also, the fluid accessory 54a may include an adjustable nozzle assembly 58 to affect the pressure of the discharged fluid.

Figure 9:
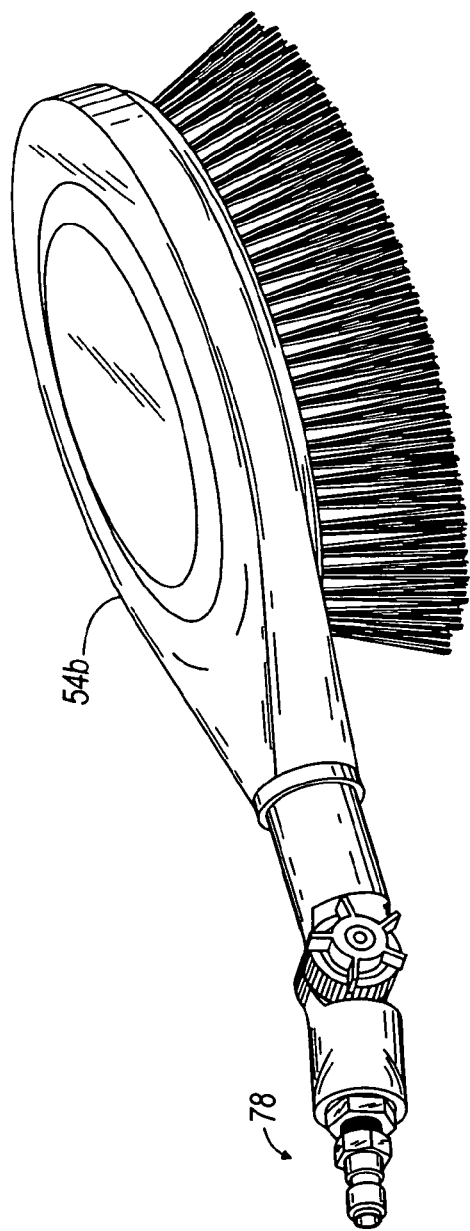
FIG. 9 is a perspective view of a second fluid accessory.
Figure 11:
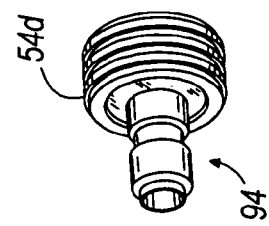
FIG. 11 is a perspective view of a forth fluid accessory.
Figure 10:
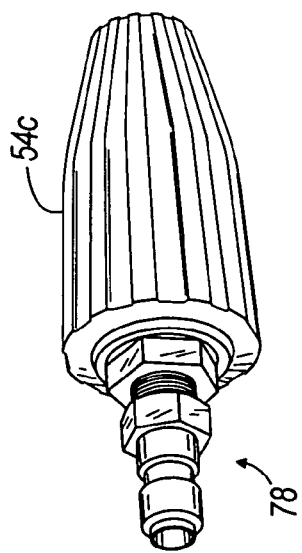
FIG. 10 is a perspective view of a third fluid accessory.
Figure 12:
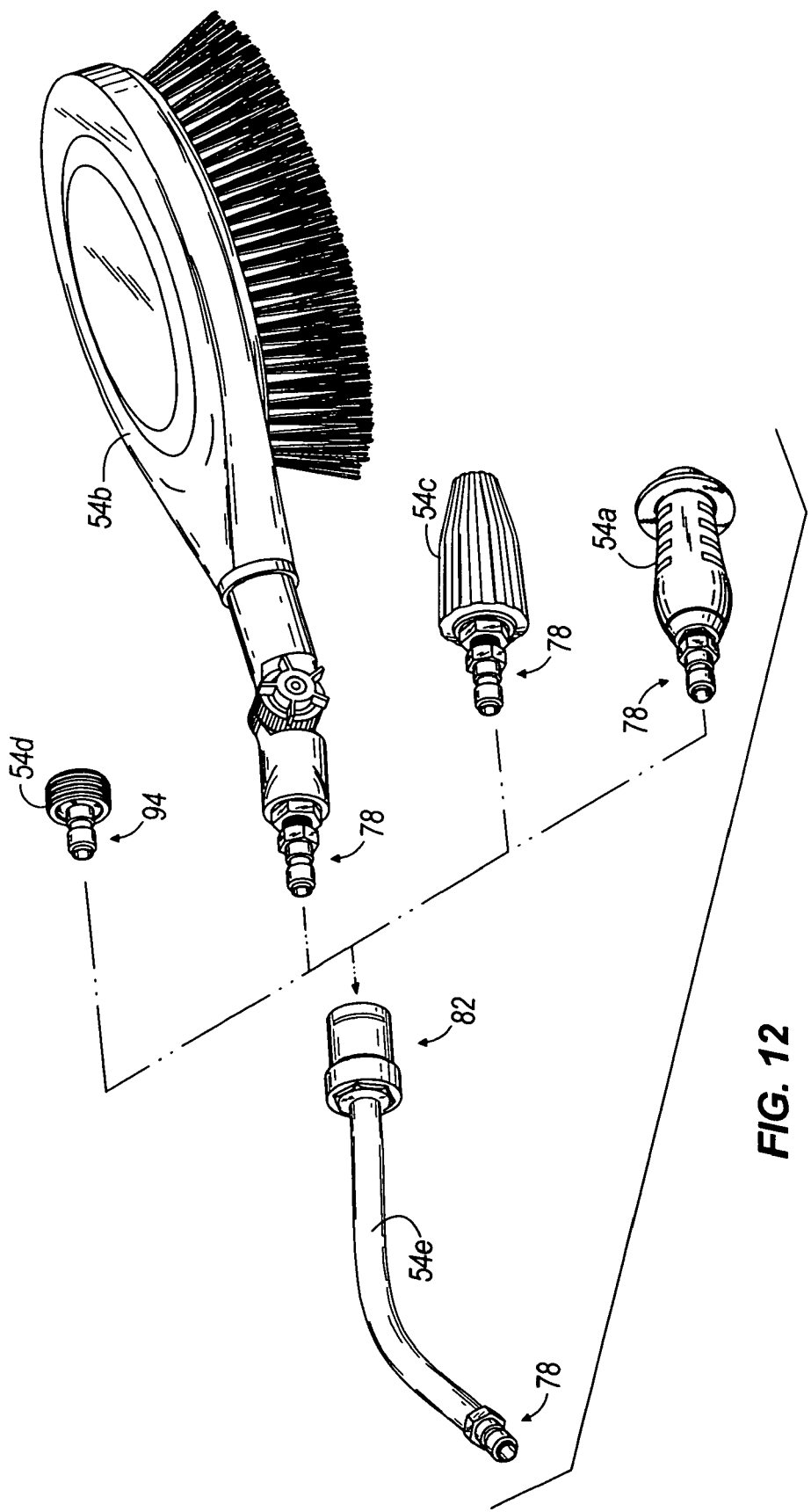
FIG. 12 is a perspective view of a fifth fluid accessory coupling the wand with another fluid accessory.

However, other fluid accessories, such as those illustrated in FIGS. 9–12, may be used rather than the fluid accessory 54a. FIG. 9 illustrates a fluid accessory 54b, such as a fixed brush or a rotating brush, that may be coupled to the wand 18. FIGS. 10 and 11 illustrate fluid accessories 54c, 54d, such as non-adjustable nozzles, that may be coupled to the wand 18. The fluid accessory 54c may output a rotating spray pattern, while the fluid accessory 54d may, for example, be configured to output a wide-angle spray pattern, a narrow-angle spray pattern, or any other type of fixed (non-adjustable) spray pattern. In addition, the fluid accessory 54d may be configured to output a high-pressure or a low-pressure spray. Further, FIG. 12 illustrates a fluid accessory 54e, such as a curved conduit extensions, coupled to the wand 18 at one end and to another fluid accessory 54a, 54b, 54c, 54d at an opposite end.

Figure 5:
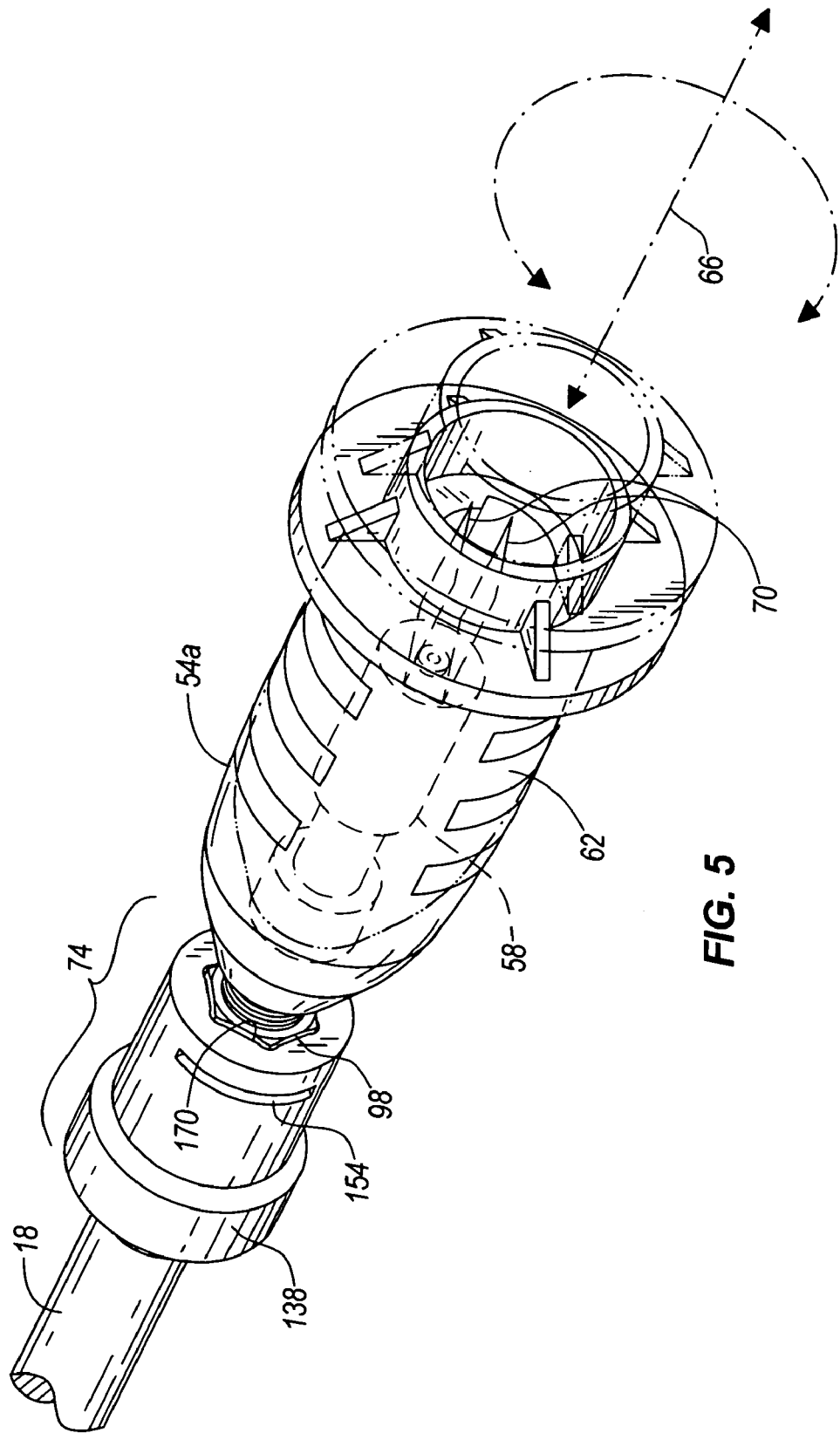
FIG. 5 is a perspective view of the fluid accessory of FIG. 2a, illustrating both axial and rotational adjustment of the fluid accessory.

In the illustrated construction, the "Hi/Lo" fluid accessory 54a includes the adjustable nozzle assembly 58 within a housing 62 (see FIGS. 3–5). The adjustable nozzle assembly 58 may be adjusted by the user by axially moving the housing 62. For example, the housing 62 may be axially moved along a longitudinal axis 66 between a first position (see FIG. 5, shown in solid), in which the fluid accessory 54a provides a high-pressure spray, and a second position (shown in phantom), in which the fluid accessory 54a provides a low-pressure spray. Further, the fluid accessory 54a of the illustrated construction includes an independently adjustable mechanism 70 for altering the spray pattern (see FIGS. 3–5). The spray pattern may be adjusted by rotating the housing 62 about the longitudinal axis 66, such that at a first rotational orientation, the fluid accessory 54a provides a wide-angle spray pattern, and at a second rotational orientation, the fluid accessory 54a provides a narrow-angle spray pattern. Since the spray pattern is independently adjustable for the nozzle assembly 58, several different combinations of the spray patterns and discharge pressures exist.

FIGS. 2a–4 illustrate a quick-disconnect assembly 74 that is operable to secure the fluid accessory 54a to the wand 18. The quick-disconnect assembly 74 includes a male fitting 78 coupled to the fluid accessory 54a and a female fitting 82 coupled to the wand 18. However, in other constructions of the pressure washer assembly 10, the male fitting 78 may be coupled to the wand 18, and the female fitting 82 may be coupled to the fluid accessory 54a. The male fitting 78 includes an externally-threaded portion 86 that is threadably engageable with an internally-threaded portion 90 of the fluid accessory 54a (see FIGS. 3–4). More specifically, the internally-threaded portion 90 is located in the nozzle assembly 58. The male fitting 78 also includes a male component 94 and a first non-circular surface such as a first hexagonal outer surface 98 adjacent the male component 94.

The non-circular outer surface 98 is shaped to be grasped by a conventional wrench or socket to tighten the male fitting 78 onto the fluid accessory 54a.

With continued reference to FIGS. 2a–4, the female fitting 82 includes an internally-threaded portion 102 that is threadably engageable with an externally-threaded portion 106 of the wand 18 (see FIGS. 3–4). The female fitting 82 includes a female component 110 having an opening 114 shaped to receive the male component 94 therein, and a second non-circular surface such as a second hexagonal outer surface 118. The non-circular outer surface 118 is shaped to be grasped by a conventional wrench or socket to tighten the female fitting 82 onto the wand 18. However, the male and female fittings 78, 82 may include other non-circular outer surfaces (e.g., a surface having two opposed flat sides), to be grasped by other conventional hand tools.

The female fitting 82 also includes a locking assembly 122 configured to lock the male component 94 to the female component 110. The locking assembly 122 includes a plurality of ball bearings 126 supported in tapered apertures 130 (see FIGS. 3–4) around the circumference of the female component 110. The tapered apertures 130 each include an outer diameter sized to allow insertion of a ball bearing 126, and an inner diameter smaller than the diameter of the ball bearing 126 to prevent the ball bearing 126 from falling through the tapered aperture 130. As a result, a portion of the ball bearing 126 is allowed to protrude into the opening 114 of the female component 110.

The locking assembly 122 may be actuated between a locked position (see FIG. 3), in which the ball bearings 126 protrude into the opening 114 of the female component 110 to engage a recessed outer surface 134 formed in the male component 94 to lock the male component 94 to the female component 110, and an unlocked position (see FIG. 4), in which the ball bearings 126 are allowed to move radially outwardly so that the ball bearings 126 may disengage the recessed outer surface 134 to allow the male component 94 to be released from the female component 110.

The female fitting 82 further includes a sleeve 138 coupled to and movable along the female component 110 to selectively actuate the locking assembly 122 between the locked position and the unlocked position. The sleeve 138 is sized such that the female component 110 is substantially surrounded by the sleeve 138. The sleeve 138 includes a raised inner surface 142 that, in part, functions as a ramp to selectively actuate the locking assembly 122 between the locked and unlocked positions. In the locked position (see FIG. 3), the sleeve 138 is positioned relative to the female component 110 such that the raised inner surface 142 is located over the ball bearings 126. As a result, the raised inner surface 142 substantially prevents the ball bearings 126 from moving radially outwardly, so that the ball bearings 126 are maintained at least partially protruding into the opening 114 of the female component 110 to engage the recessed outer surface 134 of the male component 94.

In the unlocked position (see FIG. 4), the sleeve 138 is positioned relative to the female component 110 such that the raised inner surface 142 is located adjacent the ball bearings 126. As a result, the ball bearings 126 are allowed to move radially outwardly enough so that the ball bearings 126 no longer protrude into the opening 114 of the female component 110. Further, removing the male component 94 from the opening 114 of the female component 110 causes the ball bearings 126 to be moved radially outwardly by the recessed outer surface 134, which functions like a ramp to move the ball bearings 126 radially outwardly while the male component 94 is being removed from the female component 110.

The female component 110 includes a circumferential groove 146 formed therein to receive a retaining clip 150. The retaining clip 150 substantially prevents the sleeve 138 from being removed from the female component 110. In the locked position, the raised inner surface 142 abuts the retaining clip 150 to substantially prevent movement of the sleeve 138 past the retaining clip 150. As shown in FIGS. 3–4, the sleeve 138 extends past the end of the female component 110 having the opening 114, both in the locked and unlocked positions. As such, the sleeve 138 includes a slot 154 formed therein to allow insertion of the retaining clip 150 through the sleeve 138 to engage the groove 146. The slot 154 is formed in the sleeve 138 such that the slot 154 may be aligned with the groove 146 in the unlocked position. Further, more than one slot 154 may be formed in the sleeve 138 to insert more than one retaining clip 150 into the groove 146. A coil spring 158 is sandwiched between a raised edge 162 of the female component 110 and the raised inner surface 142 of the sleeve 138 to bias the sleeve 138 toward the locked position. To move the sleeve 138 toward the 138 to the bias the sleeve 138 toward the locked position. To move the sleeve 138 toward the unlocked position, the bias of the spring 158 must be overcome. Also, a seal 166 may be positioned in the opening 114 to seal the fluid connection between the wand 18 and the fluid accessory 54a.

With reference to FIGS. 2a–2b, the sleeve 138 also includes, at one end, a first non-circular surface such as a first hexagonal inner surface 170, and at another end, a second non-circular surface such as a second hexagonal inner surface 174. The first hexagonal inner surface 170 is sized to be inserted over and engaged with the first hexagonal outer surface 98 of the male fitting 78. Likewise, the second hexagonal inner surface 174 is sized to be inserted over and engaged with the second hexagonal outer surface 118 of the female fitting 82. Thus, the sleeve 138, in addition to actuating the locking assembly 122, is also operable to rotationally interlock the male fitting 78 and the female fitting 82. However, in other constructions of the quick-disconnect assembly 74, any of a number of different non-circular engageable outer and inner surfaces may be used.

The quick-disconnect assembly 74 contrasts with conventional quick-disconnect assemblies in that the quick-disconnect assembly 74 is both axially and rotationally interlocked, while conventional quick-disconnect assemblies may only be axially interlocked. A conventional quick-disconnect assembly allows the male fitting to rotate relative to the female fitting. The sleeve is operable only to actuate the locking assembly, and does not possess the necessary structure to rotationally interlock the male and female fittings. For these and other reasons, the conventional quick-disconnect assembly may not be used to couple an adjustable fluid accessory, such as a Hi/Lo fluid accessory, to the wand because the conventional quick-disconnect assembly may allow the inner nozzle assembly (the portion of the Hi/Lo fluid accessory that is rotationally fixed relative to the attached male or female fitting) to co-rotate with the outer housing when the user attempts to adjust the spray pattern by rotating the outer housing.

Adjustable fluid accessories, such as the Hi/Lo fluid accessory, are typically permanently affixed to the wand (not shown), such that the adjustable fluid accessory requires a dedicated and separate wand from other, non-adjustable fluid accessories. This is costly to the manufacturer since additional material is required to produce the dedicated wands, and burdensome to the user since they are required to purchase multiple wands.

Select other fluid accessories, such as a brush or an extension, may also not be used with the conventional quick-disconnect assembly since they may be allowed to uncontrollably rotate, or "flop around," as the user handles the wand. As a result, additional dedicated and separate wands may be required for these fluid accessories.

The present invention, in the several embodiments discussed herein, avoids these problems by providing either a rotationally-fixed quick-disconnect assembly, or an interlock that prevents rotation. As a result, fluid accessories, such as those illustrated in FIG. 12, may be used without having to purchase a separate wand for each accessory. At the same time, other accessories may be used if modified as disclosed herein.

As shown in FIG. 3, the first hexagonal outer surface 98 is rotatably engageable with the first hexagonal inner surface 170 when the sleeve 138 is in the locked position. Further, the first hexagonal outer surface 98 and the first hexagonal inner surface 170 may be rotatably disengaged when the sleeve 138 is in the unlocked position. As shown in FIG. 5, since the male and female fittings 78, 82 are rotationally interlocked by the sleeve 138, and the nozzle assembly 58 of the fluid accessory 54a is rotationally fixed with the male fitting 78, the fluid accessory 54a may be easily rotatably adjusted to vary the spray pattern of the discharged fluid without having the nozzle assembly 58 co-rotate with the housing 62.

As previously stated, the user will often grasp the hand grip 34 of the gun assembly 30 with one hand, and the handle 38 of the wand 18 with the other hand. If one hand is to remain grasping the hand grip 34, then only one hand is available to rotatably adjust and/or axially adjust the fluid accessory 54a. Thus, having rotationally-interlocked male and female fittings 78, 82 may be desirable to the user when attempting to rotatably adjust the fluid accessory 54a with only one hand. Also, the rotationally-interlocked male and female fittings 78, 82 may be desirable to the user to substantially prevent other fluid accessories, such as those illustrated in FIG. 12, from uncontrollably rotating or flopping around during use. In addition, the dedicated or separate wands associated with adjustable fluid accessories, such as the Hi/Lo accessory, may be eliminated. Further, the rotationally-interlocked male and female fittings 78, 82 may be desirable for use with other pressurized fluid delivery apparatuses, such as, for example, air compressors or sprayers (e.g., portable hand-held pesticide and fertilizer sprayers).

Figure 6:
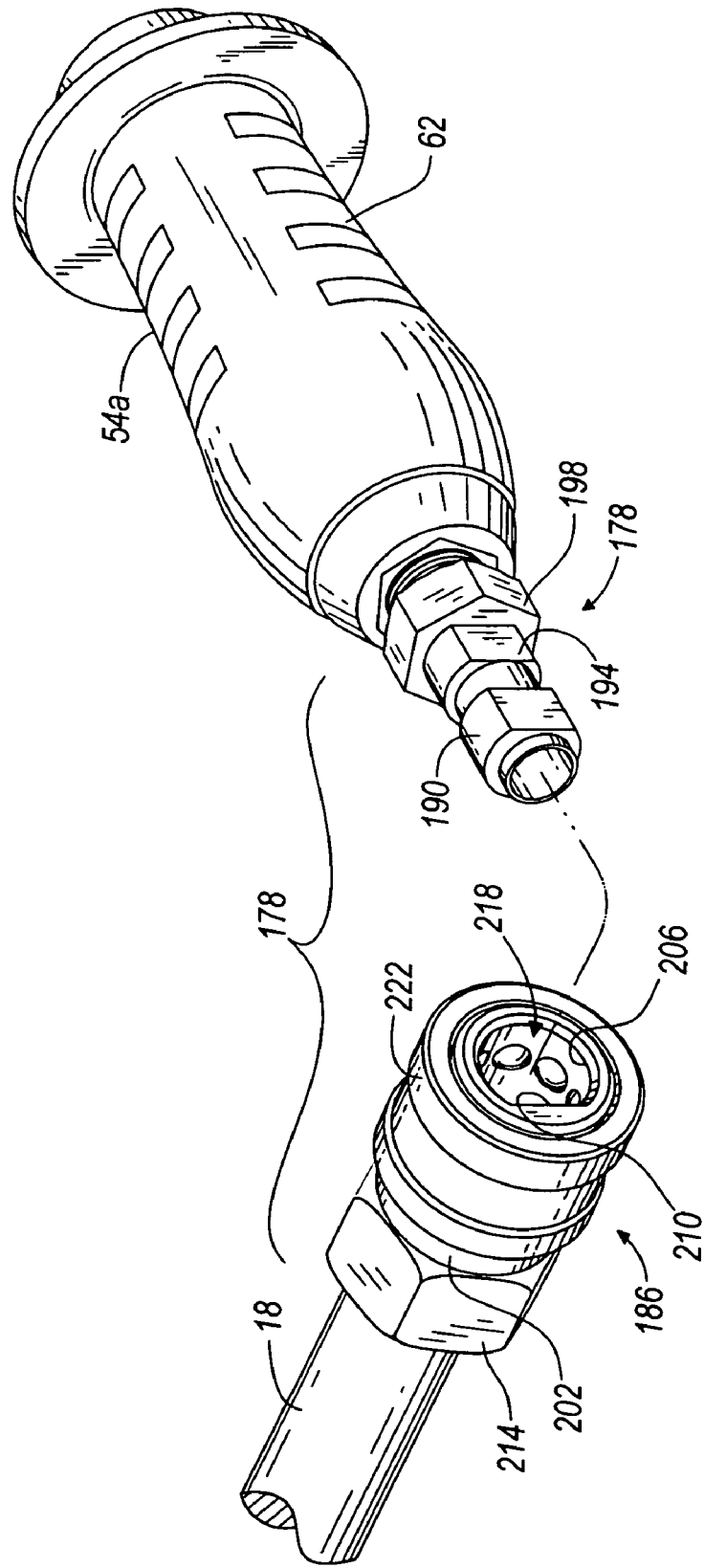
FIG. 6 is an perspective view of a second construction of a quick-disconnect assembly and a fluid accessory.

With reference to FIG. 6, a second construction of a quick-disconnect assembly 178 is shown coupling the wand 18 and the fluid accessory 54a. The wand 18 and the fluid accessory 54a may be similar to that already shown and described, and will not be described again in detail. As such, like components are labeled with like reference numerals. The quick-disconnect assembly 178 includes a male fitting 182 coupled to the fluid accessory 54a and a female fitting 186 coupled to the wand 18. Alternatively, the male fitting 182 may be coupled to the wand 18, and the female fitting 186 may be coupled to the fluid accessory 54a. The male fitting 182 is threadably connected to the fluid accessory 54a, and the female fitting 186 is threadably connected to the wand 18, similar to the male and female fittings 78, 82 shown in FIGS. 3–4.

The male fitting 182 includes a male component 190 and a first non-circular surface 194. In the illustrated construction of FIG. 6, the first non-circular surface 194 is a portion of the outer surface of the male component 190, such that the male component 190 has a non-circular cross-section. A hexagonal outer surface 198 is also formed on the male fitting 182 adjacent the first non-circular surface 194. The hexagonal outer surface 198 is shaped to be grasped by a conventional wrench or socket to tighten the male fitting 182 onto the fluid accessory 54a. With the exception of the first non-circular surface 194, the structure of the male fitting 182 is substantially the same as that previously described and shown in FIGS. 1a–5, and will not be described again in detail.

The female fitting 186 includes a female component 202 having an opening 206 shaped to receive the male component 190 therein. In the illustrated construction of FIG. 6, the opening 206 defines in part a second non-circular surface 210, such that the female component 202 has a non-circular cross-section. A hexagonal outer surface 214 is also formed on the female component 202 at an end of the female component 202 opposite the opening 206. The hexagonal outer surface 214 is shaped to be grasped by a conventional wrench or socket to tighten the female fitting 186 onto the wand 18.

The female fitting 186 also includes a locking assembly 218 substantially the same as the locking assembly 122 shown in FIGS. 2a–4, as such, further description of which is omitted. The female fitting 186 also includes a sleeve 222. The sleeve 222 is operable to actuate the locking assembly 218 between the locked and unlocked positions. However, the sleeve 222 is not operable to rotatably interlock the fluid accessory 54a and the wand 18. The operation of the sleeve 222, particularly aspects relating to actuating the locking assembly 218, is substantially the same as the sleeve 138 of FIGS. 1a–5, and will not be described again in detail.

Due to the first and second non-circular surfaces 194, 210, the male component 190 and the female component 202 become engaged and interlocked upon insertion of the male component 190 into the opening 206 of the female component 202. Further, the male component 109 may be axially locked to the female component 202 by the locking assembly 218. However, in other constructions of the quick-disconnect assembly 178, the first and second non-circular surfaces 194, 210 may take any of a number of different forms, provided the first and second non-circular surfaces 194, 210 are engageable to interlock the male and female fittings 178, 186.

Figure 7A:
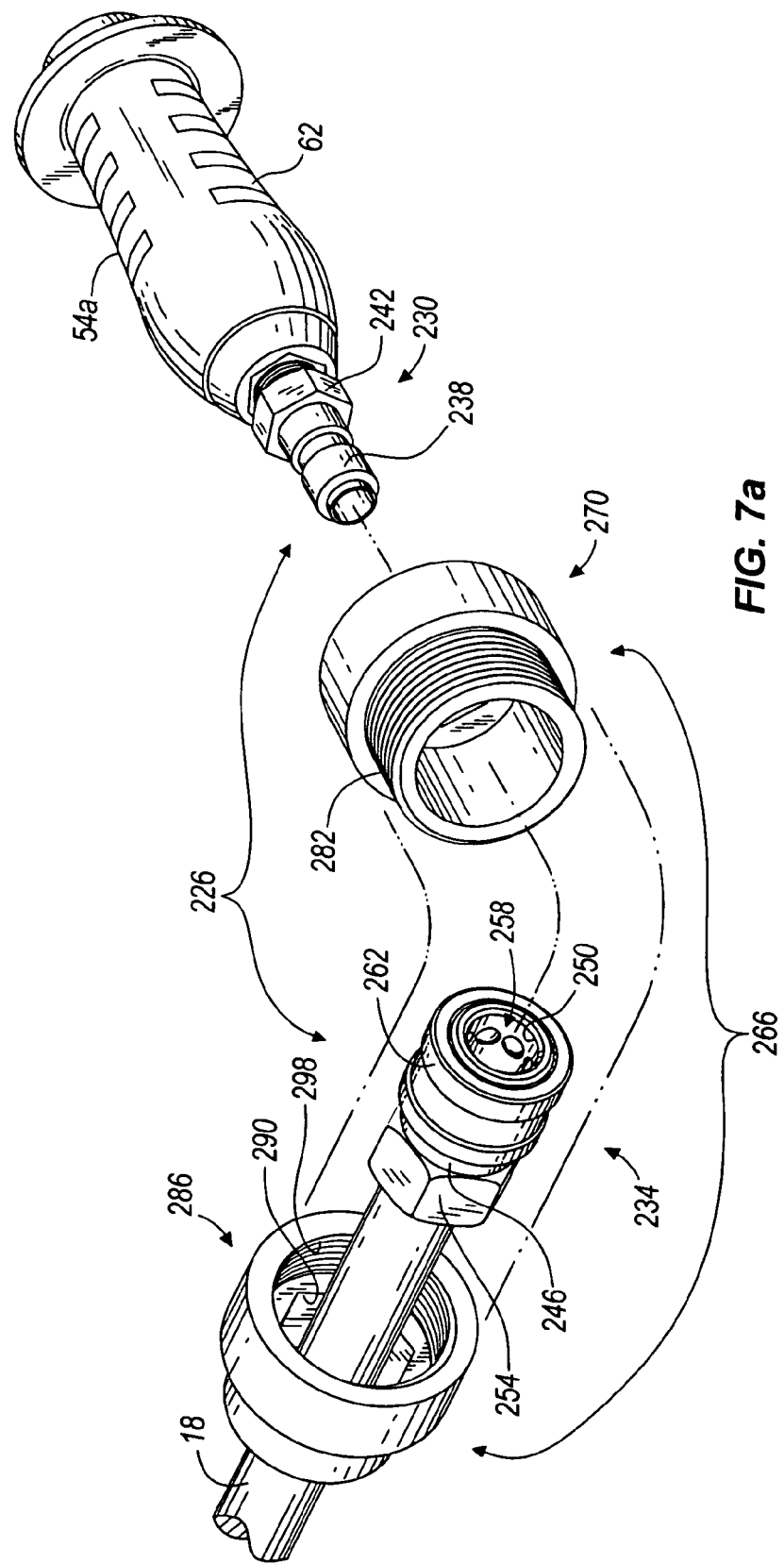
FIG. 7a is an exploded perspective view of a third construction of a quick-disconnect assembly and an interlock assembly coupled to the quick-disconnect assembly.
Figure 7B:
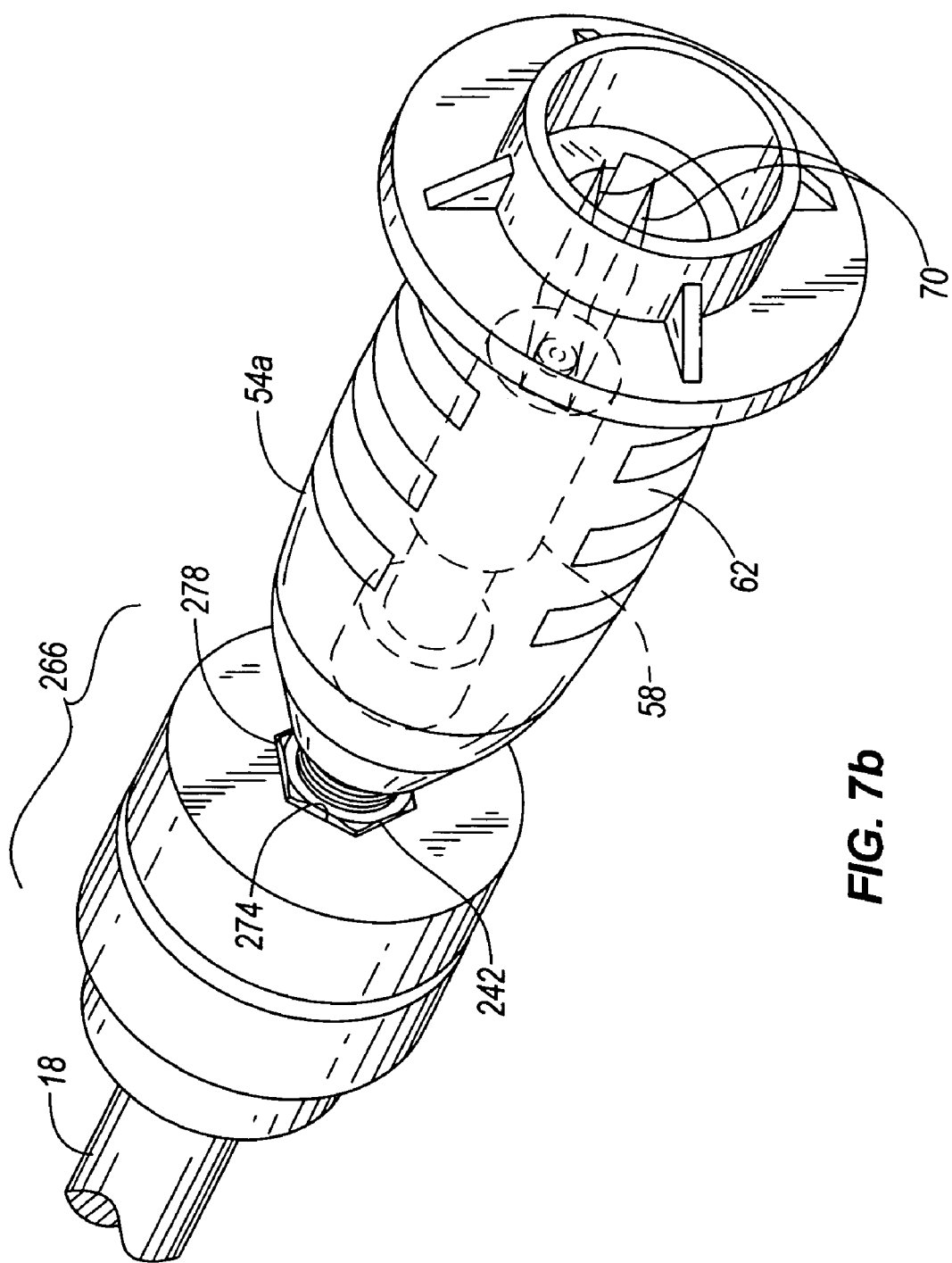
Figure 8:
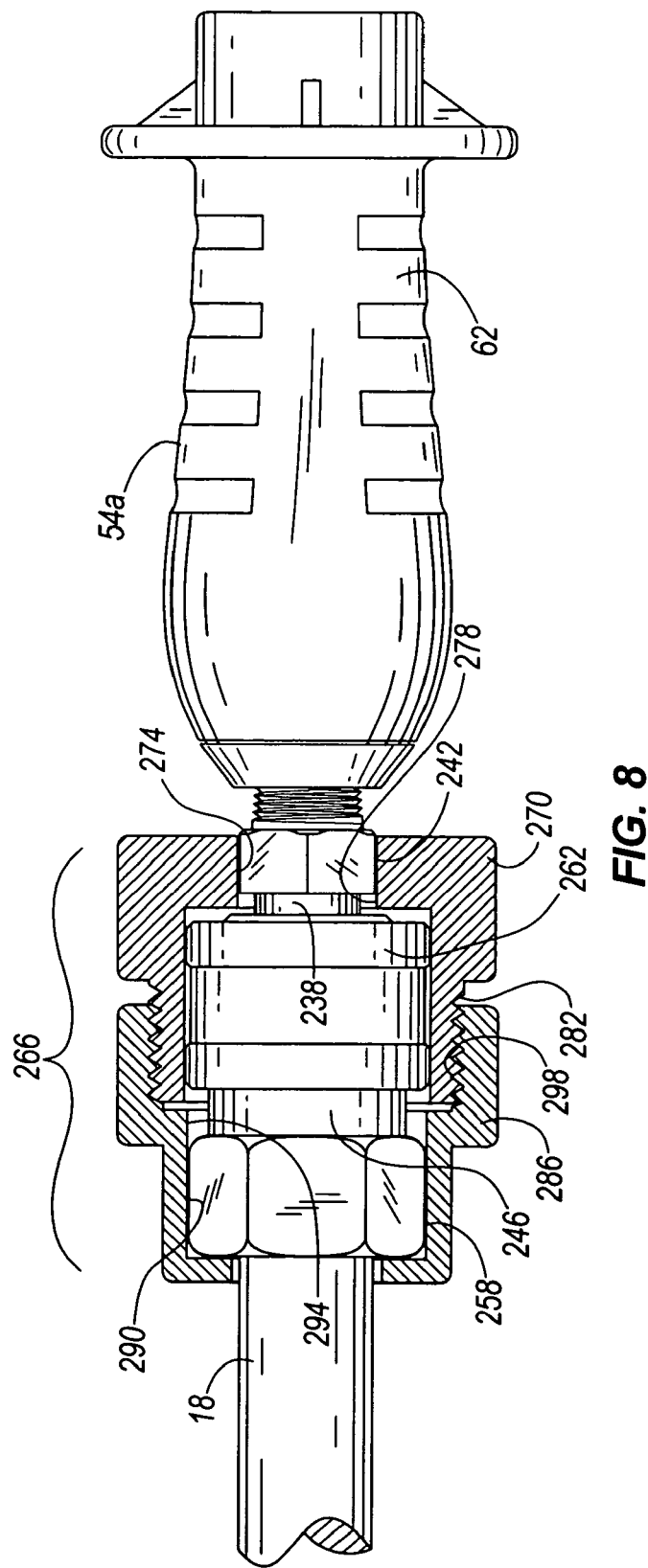

With reference to FIGS. 7a–8, a third construction of a quick-disconnect assembly 226 is shown coupling the wand 18 and the fluid accessory 54a. The wand 18 and the fluid accessory 54a may be similar to that already shown and described, and will not be described again in detail. As such, like parts are labeled with like reference numerals. The quick-disconnect assembly 226 resembles a conventional quick-disconnect assembly that is currently utilized in other fluid delivery systems such as air compressors. The quick-disconnect assembly 226 includes a male fitting 230 coupled to the fluid accessory 54a and a female fitting 234 coupled to the wand 18. Alternatively, the male fitting 230 may be coupled to the wand 18, and the female fitting 234 may be coupled to the fluid accessory 54a. The male fitting 230 is threadably connected to the fluid accessory 54a, and the female fitting 234 is threadably connected to the wand 18, similar to the male and female fittings 78, 82 shown in FIGS. 3–4.

The male fitting 230 includes a male component 238 and a first non-circular outer surface such as a first hexagonal outer surface 242 adjacent the male component 238. The first hexagonal outer surface 242 is shaped to be grasped by a conventional wrench or socket to tighten the male fitting 230 onto the fluid accessory 54a.

The female fitting 234 includes a female component 246 having an opening 250 shaped to receive the male component 238 therein, and a second non-circular outer surface such as a second hexagonal outer surface 254. The second hexagonal outer surface 254 is shaped to be grasped by a conventional wrench or socket to tighten the female fitting 234 onto the wand 18. The female fitting 234 also includes a locking assembly 258 substantially the same as that previously described and shown in FIGS. 2a–4. Further, the female fitting 234 includes an axially-movable sleeve 262 operable to actuate the locking assembly 258. However, the sleeve 262 is not operable to rotatably interlock the fluid accessory 54a and the wand 18.

An interlock assembly 266 separate from the quick-disconnect assembly 226 may then be used to rotatably interlock the fluid accessory 54a and the wand 18. The interlock assembly 266 includes a first component 270 having a first non-circular inner surface such as a first hexagonal inner surface 274 (see FIG. 7b). The first component 270 includes an aperture 278 therethrough sized to permit insertion of the male component 238 through the aperture 278. The first non-circular inner surface 274 is sized to be inserted over and engaged with the first non-circular (e.g., hexagonal) outer surface 242 of the male fitting 230. The first component 270 also includes an externally-threaded portion 282 at an end of the first component 270 opposite the end having the inner surface 274.

The interlock assembly 266 also includes a second component 286 having a second non-circular inner surface such as a second hexagonal inner surface 290 (see FIG. 7a). The second component 286 includes an aperture 294 therethrough sized to permit insertion of the wand 18 through the aperture 294. The second component 286 also includes an internally-threaded portion 298 at an end of the second component 286 opposite the end having the second hexagonal inner surface 290. Upon insertion of the male component 238 into the opening 250 of the female component 246, and axial locking of the male and female components 238, 246 by the locking assembly 258, the first and second components 270, 286 may be coupled via the threaded connection between the internally-threaded portion 298 and the externally-threaded portion 282.

To accomplish this, the male and female components 238, 246 may have to be rotated relative to each other while making the threaded connection. Since the first hexagonal inner surface 274 is engaged with the first hexagonal outer surface 242, and the second hexagonal inner surface 290 is engaged with the second hexagonal outer surface 254, the result is the fluid accessory 54a being rotatably interlocked with the wand 18. In other constructions of the quick-disconnect assembly 226 and the interlock assembly 266, the first and second non-circular outer surfaces and the first and second non-circular inner surfaces may take any of a number of different forms, provided the first non-circular outer and inner surfaces are engageable, and the second non-circular outer and inner surfaces are engageable to interlock the male and female components 238, 246, and subsequently, the fluid accessory 54a and the wand 18.

With reference to FIG. 9, the fluid accessory 54b may be modified to receive a male fitting 78 to be used in combination with the female fitting 82 to rotationally interlock the fluid accessory 54b and the wand 18. However, the male fitting 178 of FIG. 6 may be used in combination with the female fitting 186 to affix the fluid accessory 54b to the wand 18, rather than the male and female fittings 78, 82 of FIGS. 2a–4. Further, the male fitting 230 of FIG. 7a may be used in combination with the female fitting 234 and the interlock assembly 266 to rotationally interlock the fluid accessory 54b to the wand.

The fluid accessory 54c of FIG. 10 may also be modified to receive the male fitting 78 to be used in combination with the female fitting 82 to rotationally interlock the fluid accessory 54c to the wand 18. Alternatively, the quick-disconnect assembly 178, or the quick-disconnect assembly 226 in combination with the interlock assembly 266, may be substituted for the quick-disconnect assembly 74.

The fluid accessory 54d of FIG. 11 does not require the non-circular surface 98 since it is not adjustable. Rather, the fluid accessory 54d is modified to include an integral male component 94 to couple to the female component 110 of a female fitting 82. The male component 94 includes an appropriate axial length to engage the female component 94 of the female fitting 82.

The fluid accessory 54e of FIG. 12 may be modified to receive a male fitting 78 at one end of the fluid accessory 54e to be used in combination with a female fitting 82 to rotationally interlock the fluid accessory 54e to the wand 18. The fluid accessory 54e may also be modified to receive, at another end, a female fitting 82 to couple to any of the other fluid accessories 54a, 54b, 54c, 54d. Further, the quick-disconnect assembly 178, or the quick-disconnect assembly 226 in combination with the interlock assembly 266, may be substituted for the quick-disconnect assembly 74.

We claim:

1. A pressurized fluid delivery apparatus, comprising:
a pump adapted to provide a pressurized fluid;
a conduit that receives the pressurized fluid pressurized by the pump;
a fluid accessory fluidly connected with the conduit to receive the pressurized fluid from the conduit, the fluid accessory including
  a nozzle assembly configured to discharge the pressurized fluid with a spray pattern;
  an adjustable mechanism configured to widen and narrow the spray pattern;
  a housing rotatable relative to the nozzle assembly and operably coupled to the adjustable mechanism, the housing being rotatable relative to the nozzle assembly in a first direction, in which the spray pattern of the pressurized fluid is widened, and a second direction, in which the spray pattern of the pressurized fluid is narrowed; and
a quick-disconnect assembly selectively fluidly connecting the nozzle assembly and the conduit, the quick-disconnect assembly including
  a male fitting coupled to one of the nozzle assembly and the conduit, the male fitting including
    a male component;
    a first non-circular surface;
  a female fitting coupled to the other of the nozzle assembly and the conduit, the female fitting including
    a female component having an opening for receiving the male component; and
    a second non-circular surface coupled to the first non-circular surface to prevent rotation between the male fitting and the female fitting when the housing is rotated relative to the nozzle assembly.

2. The pressurized fluid delivery apparatus of claim 1,
wherein the first non-circular surface comprises a first non-circular outer surface,
wherein the second non-circular surface comprises a second non-circular outer surface, and
wherein the female fitting includes
a sleeve having a first non-circular inner surface engageable with the first non-circular outer surface of the male fitting, and
a second non-circular inner surface engageable with the second non-circular outer surface of the female fitting, to prevent rotation between the male fitting and the female fitting.

3. The pressurized fluid delivery apparatus of claim 1, wherein the first non-circular surface is adjacent the male component.

4. The pressurized fluid delivery apparatus of claim 1, wherein the second non-circular surface is adjacent the female component.

5. The pressurized fluid delivery apparatus of claim 1, further comprising a sleeve movable along the female component to selectively lock the male fitting to the female fitting.

6. The pressurized fluid delivery apparatus of claim 5, wherein the first non-circular surface of the male fitting is engaged by a first non-circular inner surface of the sleeve when the male component is engaged with the female component.

7. The pressurized fluid delivery apparatus of claim 1, wherein the first non-circular surface and the second non-circular surface are hexagonally shaped.

8. The pressurized fluid delivery apparatus of claim 1, wherein the first non-circular surface is on an surface of the male component, and wherein the second non-circular surface is on an inner surface of the female component.

9. The pressurized fluid delivery apparatus of claim 1, wherein the first non-circular surface is engageable with the second non-circular surface when the male component is engaged with the female component to prevent rotation between the male fitting and the female fitting.

10. The pressurized fluid delivery apparatus of claim 1, wherein the male fitting is coupled to the nozzle assembly.

11. The pressurized fluid delivery apparatus of claim 1, wherein the male fitting includes a threaded portion for a threaded connection with a matching threaded portion of the nozzle assembly.

12. The pressurized fluid delivery apparatus of claim 11, wherein the female fitting includes a threaded portion for a threaded connection with a matching threaded portion of the conduit.

13. The pressurized fluid delivery apparatus of claim 1, wherein the female fitting is coupled to the conduit.

14. A pressurized fluid delivery apparatus, comprising:
a pump adapted to provide a pressurized fluid;
a conduit that receives the pressurized fluid pressurized by the pump;
a fluid accessory fluidly connected with the conduit to receive the pressurized fluid from the conduit; and
a quick-disconnect assembly selectively fluidly connecting the fluid accessory and the conduit, the quick-disconnect assembly including
a male fitting coupled to one of the fluid accessory and the conduit, the male fitting including
a male component;
a first non-circular outer surface;
a female fitting coupled to the other of the fluid accessory and the conduit, the female fitting including
a female component having an opening for receiving the male component;
a second non-circular outer surface;
a sleeve having
a first non-circular inner surface engageable with the first non-circular outer surface of the male fitting;
a second non-circular inner surface engageable with the second non-circular outer surface of the female fitting to prevent rotation between the male fitting and the female fitting; and
a locking assembly that is actuable between a locked position, in which the male component may be locked to the female component, and an unlocked position, in which the male component may be released from the female component.

15. A pressurized fluid delivery apparatus, comprising:
a pump adapted to provide a pressurized fluid;
a conduit that receives the pressurized fluid pressurized by the pump;
a fluid accessory fluidly connected with the conduit to receive the pressurized fluid from the conduit;
a quick-disconnect assembly selectively fluidly connecting the fluid accessory and the conduit, the quick-disconnect assembly including
a male fitting coupled to one of the fluid accessory and the conduit, the male fitting including
a male component;
a first non-circular outer surface;
a female fitting coupled to the other of the fluid accessory and the conduit, the female fitting including
a female component having an opening for receiving the male component;
a second non-circular outer surface;
an interlock assembly for preventing rotation between the male fitting and the female fitting, the interlock assembly including
a first component having a first non-circular inner surface engageable with the first non-circular outer surface of the male fitting; and
a second component having a second non-circular inner surface engageable with the second non-circular outer surface of the female fitting, the second component being threadably connected to the first component to prevent rotation between the male fitting and the female fitting.

16. The pressure washer assembly of claim 15, wherein the first non-circular outer surface is adjacent the male component.

17. The pressure washer assembly of claim 15, wherein the second non-circular outer surface is adjacent the female component.

18. The pressure washer assembly of claim 15, wherein the first component includes an aperture therethrough.

19. The pressure washer assembly of claim 18, wherein the male component is insertable through the aperture such that the first non-circular inner surface is engageable with the first non-circular outer surface.

20. The pressure washer assembly of claim 15, wherein the second component includes an aperture therethrough.

21. The pressure washer assembly of claim 20, wherein the conduit is insertable through the aperture such that the second non-circular inner surface is engageable with the second non-circular outer surface.

22. The pressure washer assembly of claim 15, wherein the first non-circular outer surface and the first non-circular inner surface are hexagonally shaped.

23. The pressure washer assembly of claim 15, wherein the second non-circular outer surface and the second non-circular inner surface are hexagonally shaped.

24. A pressurized fluid delivery apparatus, comprising:
a pump adapted to provide a pressurized fluid;
a conduit that receives the pressurized fluid pressurized by the pump;
a brush fluidly connected with the conduit to receive the pressurized fluid from the conduit;
a quick-disconnect assembly selectively fluidly connecting the brush and the conduit, the quick-disconnect assembly including
a male fitting coupled to one of the brush and the conduit, the male fitting including
a male component;
a first non-circular surface;
a female fitting coupled to the other of the brush and the conduit, the female fitting including
a female component having an opening for receiving the male component; and
a second non-circular surface coupled to the first non-circular surface to prevent rotation between the male fitting and the female fitting so that the brush does not rotate relative to the conduit.

25. The pressurized fluid delivery apparatus of claim 24, wherein the first non-circular surface comprises a first non-circular outer surface,
wherein the second non-circular surface comprises a second non-circular outer surface, and
wherein the female fitting includes
a sleeve having a first non-circular inner surface engageable with the first non-circular outer surface of the male fitting, and
a second non-circular inner surface engageable with the second non-circular outer surface of the female fitting, to prevent rotation between the male fitting and the female fitting.

26. The pressurized fluid delivery apparatus of claim 24, wherein the first non-circular surface is adjacent the male component.

27. The pressurized fluid delivery apparatus of claim 24, wherein the second non-circular surface is adjacent the female component.

28. The pressurized fluid delivery apparatus of claim 24, further comprising a sleeve movable along the female component to selectively lock the male fitting to the female fitting.

29. The pressurized fluid delivery apparatus of claim 28, wherein the first non-circular surface of the male fitting is engaged by a first non-circular inner surface of the sleeve when the male component is engaged with the female component.

30. The pressurized fluid delivery apparatus of claim 24, wherein the first non-circular surface and the second non-circular surface are hexagonally shaped.

31. The pressurized fluid delivery apparatus of claim 24, wherein the first non-circular surface is on an outer surface of the male component, and wherein the second non-circular surface is on an inner surface of the female component.

32. The pressurized fluid delivery apparatus of claim 24, wherein the first non-circular surface is engageable with the second non-circular surface when the male component is engaged with the female component to prevent rotation between the male fitting and the female fitting.

33. The pressurized fluid delivery apparatus of claim 24, wherein the male fitting is coupled to the brush.

34. The pressurized fluid delivery apparatus of claim 24, wherein the male fitting includes a threaded portion for a threaded connection with a matching threaded portion of the brush.

35. The pressurized fluid delivery apparatus of claim 34, wherein the female fitting includes a threaded portion for a threaded connection with a matching threaded portion of the conduit.

36. The pressurized fluid delivery apparatus of claim 24, wherein the female fitting is coupled to the conduit.

* * * * *